United States Patent [19]

Fong et al.

[11] Patent Number: 4,997,890

[45] Date of Patent: Mar. 5, 1991

[54] SULFOMETHYLATION OF HIGH MOLECULAR WEIGHT POLYACRYLAMIDE

[75] Inventors: Dodd W. Fong, Naperville; Ralph W. Kaesler, Barrington, both of Ill.

[73] Assignee: Nalco Chemical Company, Naperville, Ill.

[21] Appl. No.: 150,459

[22] Filed: Jan. 29, 1988

Related U.S. Application Data

[63] Continuation-in-part of Ser. No. 103,165, Sep. 30, 1987, abandoned.

[51] Int. Cl.$^5$ ............................................. C08F 8/34
[52] U.S. Cl. .................................. 525/344; 525/329.4
[58] Field of Search .............................. 525/344, 351

[56] References Cited

U.S. PATENT DOCUMENTS 4,016,086  4/1977  Norton .................... 252/8.55 D
4,090,992  5/1978  Scanley .................. 524/555
4,703,092 10/1987  Fong ..................... 524/351

Primary Examiner—Christopher Henderson
Attorney, Agent, or Firm—Neuman, Williams, Anderson & Olson

[57] ABSTRACT

Improved methods are provided for the sulfomethylation of high molecular weight polyacrylamide polymers which reduce or minimize cross linking and result in polymers which have a reduced specific viscosity (RSV) greater than the polyacrylamide polymer used as the starting material polymer in the process.

14 Claims, No Drawings

SULFOMETHYLATION OF HIGH MOLECULAR WEIGHT POLYACRYLAMIDE

This application is a continuation-in-part of application Ser. No. 103,165 filed Sept. 30, 1987 now abandoned.

FIELD OF INVENTION

This invention relates to improved methods of sulfomethylation of high molecular weight polyacrylamide polymers and more particularly to sulfomethylation methods which reduce or minimize cross linking and result in polymers which have reduced specific viscosities (RSV) greater than the polyacrylamide polymer used as the starting material polymer in the process.

BACKGROUND OF THE INVENTION

Brief Description of the Prior Art

Sulfomethylation of polyacrylamide (PAM) polymers is reported by Schiller and Suen, Industrial Engineering Chemistry, Vol. 48, No. 12, pages 213237, December 1956. Those procedures describe introduction of sodium sulfomethyl groups into polyacrylamide through reaction with formaldehyde and sodium bisulfite at temperatures of 50 to 75° C. at pH levels above 10. An investigation of Bakalik and Kowalski, J. Polymer Science, Vol. 25, pp. 433–436 (1987) indicated that no sulfomethylation of polyacrylamide occurs by the Schiller and Suen procedure under conditions of relatively high pH and the comparatively low temperatures specified. Particularly, it has been found that the polyacrylamide undergoes hydrolysis in the reaction milieu and that a complex equilibria species form among formaldehyde, bisulfite and the ammonia that is generated.

Scanley, U.S. Pat. No. 4,090,992 (1978) describes sulfomethylation of polyacrylamide (PAM) latex (water-in-oil) using bisulfite and formaldehyde by a procedure which requires drying of the water-in-oil (PAM) latex to reduce the water content to less than 40% (based on polymer and water) and conducting the sulfomethylation at temperatures of 50-55° C.

It has more recently been determined that in the sulfomethylation of high molecular weight latex PAM's in water media, the sodium aminomethane sulfonate exists in equilibrium with formaldehyde and sodium bisulfite ($NaHSO_3$). While not completely understood, it is believed that the presence of free formaldehyde in the reaction medium may result in cross linking of the polymer which is reflected in undesirable lower or unmeasurable RSV's.

SUMMARY OF THE INVENTION

It is one of the objects of the present invention to provide a method of introducing sulfonate groups into polymers and more particularly the provision of methods or processes for the sulfomethylation of water-in-oil acrylamide polymers of high molecular weight to produce a water-in-oil latex of sulfomethylated polyacrylamide polymers which have reduced specific viscosities (RSV's) which are greater than the RSV of the original polymer. The term Reduced Specific Viscosity or RSV as used herein is the specific viscosity divided by concentration particularly as measured at concentrations of 0.45 grams of polymer in a one normal solution of sodium nitrate.

A further object of the invention is the provision of a method of sulfomethylation of polyacrylamide (PAM) to produce polymers which contain acrylamide, acrylate and sulfomethylacrylamide mer units and which polymer latices have RSV's greater than about 20.

The sulfomethylated polyacrylamides of the present invention are flocculants or thickeners useful in sludge dewatering operations, in paper manufacture, in mining and mineral processing operations and in drilling mud formulations.

Accordingly, the fulfillment of these and other objects of the present invention are provided by an improved method of sulfomethylation of polyacrylamides which comprises reacting an aqueous solution reaction mixture of polyacrylamide (PAM) in a water-in-oil suspension with formaldehyde and sodium sulfite ($Na_2SO_3$) using an excess of sulfite (as compared to formaldehyde) and wherein the weight ratio of water to the aggregate weight of polymer and water is at least about 70% or alternatively as a water to polymer ratio (W/P) of at least about 2.4, to produce a water-in-oil latex of sulfomethylated polyacrylamide polymer containing mer units of acrylamide, acrylate and sulfomethyl substituted acrylamide and which polymer latex has a reduced specific viscosity greater than the reduced specific viscosity of the PAM starting material and preferably an RSV above about 20.

DETAILED DESCRIPTION OF THE INVENTION

The process of the present invention comprises the sulfomethylation of polyacrylamides (PAM's) by reacting an emulsified water-in-oil aqueous solution of a polyacrylamide polymer wherein the weight ratio of water to polymer (W/P) in said final reaction mixture is at least about 2.4 with an excess of sodium sulfite and formaldehyde at elevated temperatures and pressures and for a time sufficient to sulfomethylate said polymer and produce a latex terpolymer containing sulfomethyl acrylamide, acrylate and acrylamide mer units and having a reduced specific viscosity greater than the original PAM latex.

The final latex reaction mixture when all process additions are complete has, as indicated above, a water to polymer (W/P) ratio of at least about 2.4 up to about 5 or expressed alternatively, a water to polymer solids content of at least about 70% up to about 83% (the percentage being the weight of water to the aggregate weight of the water and polymer solids). Preferably the W/P ratio may range from 2.4 to 3.4 or in terms of percentage water from about 70% to 77% water.

The sulfomethylation process of the present invention is carried out in the aqueous phase of a water-in-oil emulsion. In the preferred form of the instant process a water solution of the acrylamide polymer in water-in-oil emulsion form is reacted with formaldehyde and a molar excess of alkali metal sulfite as hereinafter described to produce sulfomethylated acrylamide terpolymers as water-in-oil emulsions. The so-called oil phase of the emulsion is preferably a water immiscible organic solvent, preferably a low odor paraffinic solvent (LOPS). The water-in-oil emulsion of PAM used as a starting material is prepared using a surfactant or mixture of surfactants. Such surfactants preferable include a polysoap surfactant, which may be exemplified by PA-18 (Gulf Chemical Co.), and Rapisol B-246, (I.C.I. America Inc.).

The polyacrylamide (PAM) starting material is preferably a water-in-oil latex that has a molecular weight of at least 200,000, preferably from 1 million to 5 million or more, up to as high as 25 million.

The improved sulfomethylation process of this invention can be carried out by batch polymerization procedures wherein all the ingredients and reactants are included in the batch reaction mixture at the outset of the reaction or by a preferred modified batch procedure which comprises gradually adding the formaldehyde reactant, such as preferably in aqueous solution to a reaction mixture containing all of the other reactants and components slowly over the course of the reaction. The modified batch technique enables one to reduce the mol percent excess (as compared to formaldehyde) of sodium sulfite used to achieve high RSV polymeric latices and therefore represents a significant cost advantage.

In the batch procedure a water-in-oil polyacrylamide latex is mixed with water and/or other aqueous reactants adjusted to have a water content equivalent to a water to polymer (W/P) ratio of at least 2.4 (or about 70% water). The reactants include an excess of sulfite, usually an alkali metal sulfite, and preferably sodium sulfite ($Na_2SO_3$). The preferred sodium sulfite reactant used is added in molar excess of the molar concentration of the formaldehyde reactant, which excess of sulfite can range preferably upwardly from a 10 mol% excess and most preferably in at least a 50 mol % excess compared to formaldehyde reactant. The sulfomethylation batch process may be carried out using sodium hydroxymethane sulfonate ($HOCH_2SO_3Na$) which is a complex or 1:1 adduct of sodium bisulfite and formaldehyde, in conjunction with supplemental sodium sulfite. The reaction mixture in a preferred form may also contain added or supplemental low odor paraffinic solvent (LOPS) and added surfactants such as Span 80 (sorbitan monostearate). Preferably the latex contains a polysoap surfactant. Generally, any polysoap surfactant may be used which results in a stable latex at both normal room temperatures and the elevated temperatures used in this reaction. Exemplary of such polysoap surfactants is PA-18, a 1:1 copolymer of 1-octadecene and maleic anhydride, sold by Gulf Chemicals Co. Another useful polysoap surfactant is Rapisol B-246 an ABA block copolymer wherein A = 12-hydroxy stearate (molecular wt. @ 1500) and B = polyethylene oxide (molecular wt. @ 1500) with an HLB (hydrophylic-lipophylic balance) of 5-6, manufactured by the I.C.I. America Co.

The water-in-oil polyacrylamide (PAM) latex used as a starting material is a polysoap stabilized water-in-oil emulsion in which the oil or solvent phase is a paraffinic solvent such as LOPS (Low Odor Parafinic solvent). The PAM latex may be prepared as described in U.S. Pat. No. 4,339,371. These polysoap PAM latices used as starting materials preferably have RSV's of from about 20 or above.

The sulfomethylation process of the invention is carried out at a temperature of at least 120° C. up to about 180° C. for a time period of about 30 minutes to 6 hours or more. Preferred temperature ranges are from about 140 to 165° C. A preferred reaction time ranges from about 1 to about 4 hours.

The sulfomethylation method of the invention using a modified batch process, involves slow addition of formaldehyde over the period of the reaction. In this modification, the excess of sodium sulfite necessary used is reduced and is equal to or less than a 10 mol percent excess, added to the heated aqueous mixture of polyacrylamide latex (PAM) as described above.

The sulfomethylation batch process of the invention involves the use of an adduct of bisulfite and formaldehyde, i.e., sodium hydroxymethane sulfonate ($HOCH_2SO_3Na$) to which is added an alkali metal sulfite such as sodium sulfite. The bisulfite-formaldehyde adduct used alone makes little or no contribution to the improvement of RSV of the resulting sulfomethylated product even when supplemental sodium bisulfite is added to the reaction mixture. Accordingly, in accordance with the present invention in carrying out the batch variation of the process which employs the formaldehyde-sodium bisulfite adduct as a reactant, the use of supplemental bisulfite does not appear to result in significant improvement of RSV over the starting PAM latex. Alkali metal sulfite such as sodium sulfite is however, employed in the batch procedure in a molar excess of the amount of formaldehyde or adduct used and results in improved RSV's. The alkali metal sulfite is used in excess, preferably in amounts representing at least 10% molar excess as compared with the formaldehyde reactant or adduct. The excess sodium sulfite reactant is preferably in amounts which are a 50 mol percent excess up to as high as a 150 mol percent excess or more of the formaldehyde reactant.

In the modified batch process the formaldehyde component or reactant is gradually added to the reaction mixture containing the sodium sulfite reactant. This variant or modification of the instant method assures that there is always an excess of sodium sulfite present as compared to formaldehyde or adduct. It is recognized that a change in pH can result in conversion of bisulfite to sulfite. In the examples illustrating the specific embodiments the term mol percent as applied to the reactants such as formaldehyde, the formaldehyde-bisulfite adduct and the alkali metal (sodium) sulfite refers to mol percent of acrylamide mer units in the polymer as unity or 100%.

Because the temperatures of the reaction exceeds 100° C., the process is carried out in a closed reactor under superatmospheric pressure. One convenient reactor is a Paar bomb.

DESCRIPTION OF THE PREFERRED EMBODIMENTS

The following examples illustrate methods of carrying out the sulfomethylation of polyacrylamide latex polymers in accordance with the process of the present invention. The examples illustrate the two process procedures, i.e., the batch technique or method wherein all components or reactants are gradually heated in a closed reactor vessel, designated herein as "A"; and the modified batch process or method wherein formaldehyde is gradually added (Zulauf) under pressure to the reaction vessel containing an aqueous reaction mixture of PAM and other reactants including particularly alkali metal sulfite, and preferably sodium sulfite sulfonating agent, designated herein as "Method B".

In all of these examples the starting PAM latex is a water-in-oil polysoap latex having an RSV of about 20-24.

Examples 1-3 represent batch procedures wherein sulfomethylation of a PAM water-in-oil latex is carried out using sodium hydroxymethane sulfonate (the 1:1 adduct of formaldehyde and bisulfite.) As may be seen in the examples and the accompanying table, such processes result in polymers which have low or unmeasurable RSV's, even in the instance where high W/P ratios are used (Ex. 3). Even in those cases where a measurable RSV is obtained (Ex.'s 2 and 3) the RSV is lower than that of the starting PAM latex.

Example 10 illustrates the results obtained when using equivalent amounts of formaldehyde and sodium sulfite in the modified batch procedure resulting in a latex polymer with a RSV lower than that of the starting PAM.

EXAMPLE 1

Method A

This example illustrates the low (unmeasurable) RSV's results obtained by a batch process carried out using the formaldehyde-bisulfite adduct without addition of supplemental sodium bisulfite or sodium sulfite.

Reactants

| A. | PAM Latex (a Polysoap Latex containing 30.3% polymer and 42% water; RSV = 22). | 140.00 g |
|---|---|---|
| B. | HOCH$_2$SO$_3$Na (1:1 formaldehyde-bisulfite adduct) | 16.00 g |
|   | Water | 25.00 g |
| C. | Low Odor Paraffinic Solvents (LOPS) | 50.00 g |
|   | Span 80; (sorbitan monooleate surfactant) | 2.33 g |
|   | Rapisol B-246 surfactant | 0.78 g |
|   | PA-18 surfactant | 0.78 g |
|   | Brij 92 | 7.50 g |
|   | Total | 242.39 g |
|   | W/P Ratio = 2.00 | |
|   | % water = 66.4 | |

Procedure

Reactants designated A (PAM latex) and B (20 mol % of formaldehyde bisulfite adduct) above were mixed in an open pressure reactor vessel (a Paar bomb) for five minutes and reagent C (LOPS and surfactants) was then added and the mixture of A, B and C purged with nitrogen gas. The reactor vessel was then closed and the batch reaction mixture heated at 162° C. for 1 hr. The reactor and contents were cooled and the latex removed. The latex polymer was analyzed for acrylate, acrylamide, and sulfomethyl substituted acrylamide, functional groups.

Table I following, sets out the reactants for this and other examples, the method (A or B) and conditions used (time and temperature), the mole % ratio of functional groups in the sulfomethylated PAM latex polymer and the RSV of the resulting latex. As indicated in Table I, the RSV of the latex of Example 1 was not measurable (0).

EXAMPLE 2

Method A

Reactants

| A. | PAM Latex (Polysoap Latex 30.3% polymer and 42% water. RSV = 22-24) | 120.00 g |
|---|---|---|
| B. | HOCH$_2$SO$_3$Na | 13.75 g |
|   | NaHSO$_3$ | 26.68 g |
|   | water | 26.61 g |
| C. | Low Odor Paraffinic Solvents (LOPS) | 55.65 g |
|   | Span 80 (sorbitan monooleate) surfactant | 2.00 g |
|   | Rapisol-B246 | 0.67 g |
|   | PA 18 surfactant | 0.67 g |
|   | Brij 92 (polyoxyethylene (2) oleyl ether) surfactant | 7.50 g |
|   | W/P = 2.1 | |
|   | % water = 67.9 | |

Procedure

Reactant B (20 mol % sodium hydroxymethyl sulfite and 50 mol % sodium bisulfite) dissolved in water with warming and filtered to remove undissolved solids was added to the polyacrylamide polysoap water-in-oil latex, PAM (Reactant A) in a Paar bomb reaction vessel and stirred for 30 minutes. Reactant C was then added to the mixture of A and B in the reaction vessel and the resulting mixture purged with nitrogen gas for 30 minutes. The reaction vessel was then closed and heated at 161–162° C. for 1 hour. The reaction vessel and contents were cooled and the latex removed. The latex was analyzed for acrylate, acrylamide are sulfomethyl substituted acrylamide mer units and RSV. The conditions of the process and the results are set forth in Table I following. The RSV was 14.

EXAMPLE 3

Method A

Reactants

| A. | PAM Latex (polysoap latex, 30% polymer. 42% water; RSV = 22-24) | 120.00 g |
|---|---|---|
| B. | HOCH$_2$SO$_3$Na | 13.75 g |
|   | NaHSO$_3$ | 53.40 g |
|   | water (H$_2$O) | 70.00 g |
| C. | Low Odor Paraffinic Solvents (LOPS) | 90.00 g |
|   | Span 80 Surfactant | 3.60 g |
|   | B-246 | 1.30 g |
|   | PA-18 | 1.30 g |
|   | Brig 92 | 10.00 g |
|   | W/P = 3.3; % water = 76.8 | |

Procedure

Reactant B (20 mol % sodium hydroxymethyl sulfite and 100 mol% sodium bisulfite) were dissolved in water with warming, filtered to remove undissolved solids and added to the polyacrylamide polysoap latex reagent (A) in a reaction vessel (Paar bomb) followed by stirring for minutes. Reagent C was then added to the mixture and the entire contents of the reaction vessel purged with nitrogen gas for 30 minutes. The reaction vessel was then closed and heated at 161–162° C. for 1 hour. The resulting water-in-oil sulfomethylated polyacrylamide latex was analyzed for mer units, i.e., arcylate, acrylamide and sulfomethyl substituted acrylamide groups, and RSV, the results of which analysis are set out in Table I. The resulting RSV of 14 was lower than the RSV of the starting PAM latex.

EXAMPLE 4

Method B

Reactants:

| A. | PAM polysoap Latex (30% polymer, 42% water; RSV = 22-24) | 109.00 g |
|---|---|---|
| B. | Na$_2$SO$_3$ | 17.60 g |
|   | Water | 44.00 g |
| C. | CH$_2$O (formaldehyde); 37% aqueous solution | 7.40 g |
| D. | Low Odor Paraffinic Solvent (LOPS) | 28.80 g |
|   | Surfactant Span 80 | 7.00 g |
|   | W/P = 2.7; % water = 73.1 | |

Procedure:

The reactants designated A, B and D were placed in a reaction vessel, stirred and purged with nitrogen gas for 30 minutes. The reaction vessel was then closed and formaldehyde Reactant (C) was introduced under pressure gradually into the vessel and contents heated to 162° C. The time of formaldehyde addition was a period of about 60-65 minutes. The reactor vessel and contents were then cooled and the latex removed. The resulting water-in-oil sulfomethylated polyacrylamide latex was then tested to determine its reduced specific viscosity (RSV) and the polymer analyzed for the functional mer units sulfomethylacrylamide, acrylate and acrylamide. The reaction conditions and analytical results are set forth in Table I following. The latex had 3.5 mol % sulfite groups (SO$_3$) or mer units and RSV of 44.3, as compared to an RSV of 22 for the PAM latex starting material.

EXAMPLE 5

Method B

Reactants:

| A. | PAM polysoap Latex (30% polymer, 42% water; RSV = 22-24) | 93.40 g |
|----|---|---|
| B. | Na$_2$SO$_3$ | 15.10 g |
|    | Water | 46.80 g |
| C. | CH$_2$O (formaldehyde) | 6.42 g |
| D. | Low Odor Paraffinic Solvent (LOPS) | 36.00 g |
|    | Span 80 surfactant | 6.00 g |
|    | Total | 203.72 |
|    | W/P = 3.1; % water = 75.2 | |

Procedure:

The reactants designated A, B and D were placed in a reaction vessel, stirred and purged with nitrogen gas (30 minutes). The reaction vessel was then closed and formaldehyde (C) was introduced gradually into the vessel over a period of 60 minutes at a temperature of 161° C. The reaction vessel and contents were cooled and the resulting sulfomethylated polyacrylamide water-in-oil latex removed. The latex was then tested to determine its reduced specific viscosity (RSV) and the polymer analyzed for the functional mer units sulfomethylacrylamide, acrylate and acrylamide. The conditions of the process and analytical results are set forth in Table I following.

EXAMPLE 6

Method B

Reactants

| A. | PAM polysoap Latex (30% polymer, 42% water; RSV = 22-24) | 109.00 g |
|----|---|---|
| B. | Na$_2$SO$_3$ | 17.60 g |
|    | Water | 44.00 g |
| C. | CH$_2$O (formaldehyde) | 7.40 g |
| D. | Low Odor Paraffinic Solvent (LOPS) | 28.00 g |
|    | Span 80 surfactant | 14.60 g |
|    | Total | 220.6 g |
|    | W/P = 2.7; % water = 73.1 | |

Procedure

The reactants (A), (B) and (D) were placed in an open reaction vessel, stirred and purged with nitrogen gas for 30 minutes. The reaction vessel was then closed and formaldehyde (C) was introduced gradually under pressure into the sealed vessel over a period of 2 hours and 40 minutes with the vessel and reactants maintained at 161° C. The reaction vessel and contents were heated at 160-161° C. for an additional 20 minutes and then cooled and the resulting sulfomethylated polyacrylamide water-in-oil latex removed. The latex was then tested to determine its reduced specific viscosity and the polymer analyzed for the functional mer units, sulfomethylacrylamide, acrylate and acrylamide. The conditions of the process and results are set forth in Table I following.

EXAMPLE 7

Method B

Reactants:

| A. | PAM polysoap Latex (30% polymer, 42% water; RSV = 22) | 109.00 g |
|----|---|---|
| B. | Na$_2$SO$_3$ | 17.60 g |
|    | Water | 44.00 g |
| C. | CH$_2$O (formaldehyde) | 7.40 g |
| D. | Low Odor Paraffinic Solvent (LOPS) | 28.00 g |
|    | Span 80 surfactant | 14.60 g |
|    | Total | 220.6 g |
|    | W/P = 2.7; % water = 73.1 | |

Procedure:

The reactants (A), (B) and (D) were placed in an open reaction vessel, stirred and purged with nitrogen gas (30 minutes). The reaction vessel was then sealed and formaldehyde, reactant (C), was introduced under pressure gradually into the sealed vessel over a period of 3 hours saturated at a temperature of 161° C. The reaction vessel and contents were cooled and the resulting sulfomethylated polyacrylamide water-in-oil latex removed. The latex was then tested to determine its reduced specific viscosity and the polymer analyzed for functional mer units sulfomethylacrylamide, acrylate and acrylamide. The conditions of the process and results are set forth in Table I following.

EXAMPLE 8

Method A

Reactants

| A. | PAM polysoap Latex (30% polymer, 42% water; RSV = 22-24) | 100.00 g |
|----|---|---|
| B. | HOCH$_2$SO$_3$Na | 11.45 g |
|    | Na$_2$SO$_3$ | 26.90 g |
|    | water | 50.00 g |
|    | NaOH (50%) | 0.30 g |
| C. | Low Odor Paraffinic Solvents (LOPS) | 70.00 g |
|    | Span 80 surfactant | 2.40 g |
|    | B-246 surfactant | 0.84 g |
|    | PA-18 surfactant | 0.84 g |
|    | Brij 92 surfactant | 7.50 g |
|    | Total: | 270.2 g |
|    | W/P = 3.1; % water = 75.3 | |

Procedure

Reactant B was dissolved in water in an open reactor with warming, filtered to remove undissolved solids and added to latex reagent (A) followed by stirring for 30 minutes. Reactant C was then added to the mixture and purged with nitrogen gas for 30 minutes. The reaction vessel was then closed and heated at 161-162° C. for 1 hour. The reaction vessel and contents were cooled and the resulting latex removed. The latex was tested to determine its RSV and analyzed for the functional mer units acrylate, acrylamide and sulfomethylacrylamide. The conditions of the process and results are set forth in Table I.

EXAMPLE 9

Method A

Reactants

| A. | PAM polysoap Latex (30% polymer, 42% water, RSV = 22-24) | 77.80 g |
|---|---|---|
| B. | HOCH$_2$SO$_3$Na | 8.90 g |
| | Na$_2$SO$_3$ | 21.00 g |
| | water (H$_2$O) | 39.00 g |
| | NaOH (50%) | 0.23 g |
| C. | Low Odor Paraffinic Solvents (LOPS) | 55.00 g |
| | Span 80 surfactant | 1.90 g |
| | B-246 surfactant | 0.65 g |
| | PA-18 surfactant | 0.65 g |
| | Brij 92 surfactant | 5.90 g |
| | Total: | 211.03 g |
| | W/P = 3.1; % water = 75.3 | |

Procedure

The reactants designated A, B and D were placed in a reaction vessel, stirred and purged with nitrogen gas (30 minutes). The reaction vessel was then closed and formaldehyde Reactant (C) was introduced under pressure gradually into the vessel and contents heated to 162° C. The time of formaldehyde addition was a period of about 60-65 minutes. The reactor vessel and contents were cooled and the latex removed. The result of water in oil latex was then tested to ascertain its reduced specific viscosity and the polymer analyzed for the functional mer units sulfomethyl acrylamide, acrylate and acrylamide. The reaction conditions and analytical results are set forth in Table I following.

TABLE I

SULFOMETHYLATIONS OF HIGH MOLECULAR WEIGHT LATEX PAM[1]

| EXAMPLE | REAGENTS (MOLE %) | NaHSO$_3$ (MOLE %) | Na$_2$SO$_3$ (MOLE %) | W/P[6] | WATER[2] (WT %) | METHOD[4] | TEMP. °C. | HOURS | PRODUCT SO$_3^-$/COO$^-$/CONH$_2$[3] (MOLE %) | RSV |
|---|---|---|---|---|---|---|---|---|---|---|
| 1 | 20-HOCH$_2$SO$_3$Na | — | — | 2.0 | 66.4 | A | 162 | 1 | 3.5/3.5/93.0 | (0)[5] |
| 2 | 20-HOCH$_2$SO$_3$Na | 50 | — | 2.1 | 67.9 | A | 162 | 1 | 6.0/19.8/74.2 | 14 |
| 3 | 20-HOCH$_2$SO$_3$Na | 100 | — | 3.3 | 76.8 | A | 162 | 1 | 5.3/22.2/72.5 | 14 |
| 4 | 20-CH$_2$O | — | 30 | 2.7 | 73.1 | B | 161 | 1 | 3.9/32.8/63.3 | 44.3 |
| 5 | 20-CH$_2$O | — | 30 | 3.1 | 75.2 | B | 161 | 1 | 4.6/38.3/57.1 | 40.0 |
| 6 | 20-CH$_2$O | — | 30 | 2.7 | 73.1 | B | 161 | 3 | 6.6/35.7/57.1 | 27.2 |
| 7 | 20-CH$_2$O | — | 30 | 2.7 | 73.1 | B | 161 | 3 | 8.7/38.3/53.0 | 24.5 |
| 8 | 20-HOCH$_2$SO$_3$Na | — | 50 | 3.1 | 75.3 | A | 161 | 1 | 5.3/35.2/59.5 | 38.3 |
| 9 | 20-HOCH$_2$SO$_3$Na | — | 50 | 3.1 | 75.3 | A | 161 | 2 | 8.3/38.8/52.9 | 30.9 |
| 10 | 20-CH$_2$O | — | 20 | 3.0 | 75.6 | B | 161 | 1 | 3.7/23.9/72.5 | 11.2 |
| 11 | 20-HOCH$_2$SO$_3$Na | — | 30 | 3.1 | 75.0 | A | 161 | 1 | 5.2/39.0/55.8 | 29.3 |

[1]RSV = 24
[2]Based on initial polymer and water, i.e., wt water/wt water + wt polymer
[3]Terpolymer composition: mer units of sulfomethyl acrylamide, acrylate, and acrylamide
[4]Method A: direct heating of latex and HOCH$_2$SO$_3$Na - Method B: slow addition of CH$_2$O
[5]Not measurable (insoluble)
[6]Weight of water/weight of polymer

Procedure

Reactant B was dissolved in water with warming, filtered to remove undissolved solids and added to latex (A) in an open reactor followed by stirring for 30 minutes. Reactant C was then added to the mixture and the mixture purged with nitrogen gas for 30 minutes. The reaction vessel was then closed and heated at 161-162° C. for 2 hours. The reaction vessel and contents were cooled and the latex was removed. The latex was tested to determine its RSV and analyzed for the functional mer units; acrylate, acrylamide and sulfomethylacylamide. The conditions of the process and the results are set forth in Table I following.

EXAMPLE 10

Method B

Reactants

| A. | PAM polysoap latex (30% polymer, 42% water; RSV = 22-24) | 93.40 g |
|---|---|---|
| B. | Na$_2$SO$_3$ | 10.04 g |
| | water | 46.80 g |
| C. | CH$_2$O (Formaldehyde) | 6.42 g |
| D. | Low Odor Paraffinic Solvent Span 80 surfactant | 28.80 g |
| | Total | 198.60 g |
| | W/P = 3.0; % water = 75.6 | |

EXAMPLE 11

Method A

Reactants

| A. | PAM polysoap latex (30% polymer, 42% water; RSV = 22-24) | 100.00 g |
|---|---|---|
| B. | HOCH$_2$SO$_3$Na | 11.45 g |
| | NaSO$_3$ | 16.10 g |
| | water | 50.00 g |
| C. | Low Odor Paraffinic Solvent | 70.00 g |
| | Span 80 surfactant | 2.40 g |
| | B-246 surfactant | 0.84 g |
| | PA-18 surfactant | 0.84 g |
| | Brij 92 surfactant | 7.59 g |
| | Total: | 254.80 g |
| | W/P = 3.1; % water = 75.0 | |

Procedure

Reactant B was dissolved in water in an open reactor with warming, filtered to remove undissolved solids and added to latex reagent (A) followed by stirring for 30 minutes. Reactant C was then added to the mixture and purged with nitrogen gas for 30 minutes. The reaction vessel was then closed and heated at 161-162° C. for 1 hour. The reaction vessel and contents were cooled and the resulting latex removed. The latex was tested to determine its RSV and analyzed for the functional mer units acrylate, acrylamide, and sulfomethyl acrylamide. The condition of the process and results are set forth in Table I.

From Table I it is apparent that greatly improved RSV's can be obtained by the method of the invention described herein.

Thus Example 1 demonstrates that the use of the 1:1 adduct of formaldehyde-bisulfate and employing W/P ratios of less than 2.4 or weight percentages of polymer to the aggregate weight of polymer and water of less than 70% in a batch process results in latex polymers which have RSV's less than the starting material in this case zero.

In examples 2 and 3 all reaction mixtures had W/P ratios of less than 2.7 or as shown in the table a weight percent of water of less than 70% in the case of Ex. 2 and greater than 70% in the case of Example 3. The sulfomethylation process of Examples 2 and 3 was carried out using the formaldehyde-bisulfite adduct with supplemental bisulfite added resulting in latex polymers having RSV's of 14, lower than the RSV of 20-24 for the PAM starting material.

Examples 4–9 and 11 illustrate the production of sulfomethylated polyacrylamide latices all with RSV's greater than 24. The processes used to prepare these examples all used W/P ratios in excess of 2.4 and a water to polymer weight percentage greater than 70%. Examples 4, 5, 6 and 7 were carried out by the modified batch method (B) were formaldehyde is added gradually in the process.

Example 11 uses procedure A, a batch process. Example 10 illustrates the importance of using an excess of alkali metal sulfate, the particular example using equimolar amounts resulting in low (11.2) RSV's.

We claim:

1. A process for preparing water-in-oil sulfomethylated polyacrylamide polymers having high reduced specific viscosities (RSV) which comprises reacting a polyacrylamide water-in-oil polysoap latex, said polyacrylamide polymer having a molecular weight of at least about two hundred thousand, with formaldehyde or an adduct of formaldehyde and bisulfite and a molar excess of an alkali metal sulfite as compared with the moles of formaldehyde used, in a reaction mixture which has a water-to-polymer (W/P) ratio of from at least about 2.4 up to about 5, at elevated temperatures above about 100° C. and superatmospheric pressures for a period of from about 1 to about 6 hours to produce a water-in-oil latex terpolymer containing acrylamide, acrylate and sulfomethylacrylamide groups, said alkali metal sulfite being employed in sufficient excess such that the resulting latex has an RSV of at least about 20 and is greater than the RSV of the starting polyacrylamide polymer latex.

2. A process according to claim 1 wherein the mol percent excess of alkali metal sulfite to formaldehyde is at least a 50 mol percent excess.

3. A process according to claim 1 wherein the alkali metal sulfite is sodium sulfite.

4. A process according to claim 1 wherein the reaction is carried out at a temperature above about 120° C.

5. A process according to claim 1 wherein the reaction is carried out at a temperature between about 140 and 165° C.

6. A process according to claim 1 wherein the reaction is carried out at a temperature of about 165° C.

7. A process according to claim 1 wherein the polysoap surfactant employed in the polyacrylamide latex is an ABA type block copolymer of 12-hydroxystearate and polyethylene oxide, with an HLB of 5–6.

8. A process according to claim 1 wherein the formaldehyde reactant is separately added gradually to the reaction mixture during the reaction.

9. A process according to claim 1 wherein the formaldehyde reactant is separately added gradually to the reaction mixture over a period of at least about 30 minutes.

10. A process according to claim 9 wherein the formaldehyde added is an aqueous solution.

11. A process according to claim 1 wherein supplemental surfactants are added to the reaction mixture.

12. A process according to claim 1 wherein supplemental organic solvent is added to the reaction mixture.

13. A process according to claim 1 wherein the resulting water-in-oil latex has an RSV of at least about 20.

14. A process according to claim 1 wherein the molar excess of alkali metal sulfite compared to formaldehyde used is present at all times in an amount sufficient t produce a terpolymer latex having an RSV greater than the starting polymer.

* * * * *